United States Patent [19]

Jones

[11] Patent Number: 5,092,472
[45] Date of Patent: Mar. 3, 1992

[54] HAT HOLDING APPARATUS

[76] Inventor: Kevin C. Jones, 24562 Creekview Dr., Laguna Hills, Calif. 92653

[21] Appl. No.: 306,073

[22] Filed: Feb. 6, 1989

[51] Int. Cl.⁵ .............................................. A47F 7/00
[52] U.S. Cl. ...................................... 211/30; 211/31
[58] Field of Search ...................... 211/30, 31, 32, 33; 248/205.2; 24/306, 442

[56] References Cited

U.S. PATENT DOCUMENTS

| | | | |
|---|---|---|---|
| 756,023 | 3/1904 | Johnson et al. | 211/30 |
| 1,511,864 | 10/1924 | Altmyer | 211/31 |
| 1,567,619 | 12/1925 | Rodstein | 211/31 |
| 1,654,063 | 12/1927 | Yarbrough | 211/31 |
| 1,978,216 | 10/1934 | Miller | 211/31 |
| 2,319,747 | 5/1943 | Osborne | 211/31 |
| 2,916,149 | 12/1959 | Behrendt | 211/31 |
| 4,548,375 | 10/1985 | Moss | 248/205.2 |
| 4,606,079 | 8/1986 | DeWoskin | 24/306 X |
| 4,759,963 | 7/1988 | Uso, Jr. et al. | 248/205.2 X |

*Primary Examiner*—David M. Purol
*Assistant Examiner*—Sarah A. Lechok
*Attorney, Agent, or Firm*—Leonard Tachner

[57] ABSTRACT

An improved hat holder having a crown ring and at least one adjustable strap for receiving a hat of the type having a crown and a brim for securing the hat to a surface. In a preferred embodiment, a pair of straps are connected to the surface by means of a first pair of Velcro pads connected to the ends of the straps and a second pair of Velcro pads adhesively connected to the surface whereby the hat may be conveniently placed or removed from the holder by simply separating one or both such straps at the Velcro pads from the surface.

5 Claims, 2 Drawing Sheets

HAT HOLDING APPARATUS

BACKGROUND OF THE INVENTION

1. Field of the Invention

The present invention relates generally to hat storage or supporting devices and more specifically to an improved apparatus for providing a suitable, safe and convenient place to dispose of a hat when not in use such as the inner roof of an automobile where it will not interfere with nor inconvenience the passengers.

2. Prior Art

The general concept of utilizing a ring shaped holder for storing a brimmed hat against a surface such as the interior roof of an automobile is not per se new. By way of example, U.S. Pat. No. 1,732,863 to Ruben is directed to a hat holder which is releasably mounted to a shelf through fasteners which are inserted into a hole slot of a circular frame. This patent is generally directed to a wire type system for holding a hat.

U.S. Pat. No. 1,978,216 to Miller is directed to an automobile hat rack which uses hooks to mount the system to the upholstery. A plurality of tapes pass around the hat contour for securing the hat to the hooks.

U.S. Pat. No. 1,379,605 to Allen is directed to another type of hat holder and provides for a strip which passes through eyes at opposing ends. Hooks are included for mounting to what appears to be the top of the automobile. The strips are apparently flexible so that they can be contoured to the crown of the hat contour.

U.S. Pat. No. 3,046,049 to Paxton is directed to an automobile hat rack in which a pair of wire legs hold a hat against the roof of the automobile while the wire legs are attached to the visor holder.

All such prior art known to the applicant suffers from a number of disadvantages. One such disadvantage is the method of securing the hat holding apparatus to the supporting surface such as the interior roof of an automobile. More specifically, each such prior art device requires either the use of fastening elements such as screws, bolts and the like or the use of hooks which produce holes and tears in the roof material. Consequently, installation of the prior art devices produces a permanent marring effect on the supporting surface which in the case of, for example, an automobile or truck interior could detrimentally affect the value of the vehicle.

Still another disadvantage of the prior art is the fact that most, if not all, such prior art devices rely on the use of metal materials to secure the hat crown or brim to the underlying structure. Unfortunately, the use of metal materials, as well as other relatively thinly shaped structural materials for holding the hat, crown or brim, can produce marks on the hat surface, particularly on soft materials such as felt. In addition, certain metals readily rust, which could stain the hat material and perhaps most importantly, such materials are relatively difficult to shape and expensive to manufacture for the particular purpose intended.

Still another disadvantage of the prior art devices is the lack of adjustability. More specifically, while such prior art devices are designed for generally standard hat sizes and shapes, any substantial deviation from such standard, sizes and shapes, such as non-standard brim shapes and thicknesses as well as unusual brim and crown contours which may be aesthetically pleasing to the wearer, would not be accommodated by the prior art devices which are designed for the standard shapes and sizes. Consequently, the prior art devices, without the capability for adjustment, may readily produce distortions in the hat contour which even if not permanent would require the wearer to suffer the inconvenience of having to reshape the contour of his hat each time he removes it from the supporting structure.

There has therefore been a long felt need for a hat holder which overcomes the aforementioned deficiencies of the prior art and more specifically which provides a relatively noninvasive means for securing the holder to the underlying surface while still permitting convenient temporary removal of at least a portion thereof for installing or removing the hat. In addition, there is a long felt need for a hat holder which utilizes materials which will not stain, mark or distort the hat when it is being secured therein and there has been a longfelt need for adjustability which permits the user to adjust the hat holder for different brim shapes, different thicknesses and different brim and crown contours of even the most delicate hat materials.

SUMMARY OF THE INVENTION

The present invention solves the aforementioned deficiencies of the prior art and meets all of the aforementioned long felt needs by providing a hat holder comprising a crown ring made of a flexible plastic tube in a preferred embodiment. The tube is secured for supporting the hat in place by means of a pair of adjustable straps. Each such strap is provided with a first Velcro pad at the end thereof opposite the tube and a pair of second Velcro pads are adhesively secured to the underlying surface to provide a non-invasive manner for securing the holder to that underlying surface while providing a convenient method for repeatedly disengaging one or both straps from that surface for installing or removing the hat. One of the unique features of the present invention comprises the manner in which each adjustable strap interfaces with the corresponding first Velcro pad. More specifically, in order to provide the Velcro-to-Velcro interface with maximum resistance to inadvertent separation in response to the weight of the hat supported by the present invention, the adjustable strap is sewn or otherwise affixed to the first Velcro pad at a location which is biased toward the crown ring so that the interface occurs at a location less than 50% of the width of the Velcro pad and more than 25% of the width thereof. In a preferred embodiment of the invention, the adjustable strap/first Velcro pad interface is provided at about the 33Δ% point along the length of the first Velcro pad wherein approximately ⅓ of the first Velcro pad width is provided on the ring side of the pad and about ⅔ of the pad is provided on the peripheral side of the pad as will be described hereinafter in more detail.

The present invention is not merely a substitution of materials of prior art hat holders, for in addition to changing materials as hereinafter described, the present invention also provides novel and highly advantageous structural changes including by way of example, the aforementioned strap adjustability feature which provides a capability not heretofore available in the prior art.

OBJECTS OF THE INVENTION

It is therefore, a principal object of the present invention to provide an improved hat holder such as for use in storing a hat on the interior roof surface of an automobile or truck and which provides a non-invasive structure for securing the holder to the vehicle interior and which utilizes materials which will not stain or distort the hat structure and which provides an adjustability feature for accommodating non-standard hat shapes, contours and dimensions which obviates any requirement that the wearer re-contour his hat after it has been stored.

It is an additional object of the present invention to provide an improved hat holder for securing a hat to virtually any type of smooth surface in a relatively non-invasive manner, that is, without requiring any holes or punctures to be made into that surface.

It is still an additional object of the present invention to provide an improved hat holder, the crown support ring of which is made of a plastic, flexible tube, the surface and dimensions of which preclude any inadvertent damage to the hat fabric.

It is still an additional object of the present invention to provide an improved hat holder having an adjustability feature to accommodate hat shapes and dimensions which are non-standard as well as accommodating unique contours which are aesthetically pleasing to the wearer.

It is still an additional object of the present invention to provide an improved hat holder utilizing Velcro pads to releasably secure the holder to an underlying structure, the interface between the Velcro pads and the remaining hat holder apparatus being designed to minimize the risk of inadvertently allowing the hat to be released.

BRIEF DESCRIPTION OF THE DRAWINGS

The aforementioned objects and advantages of the present invention, as well as additional objects and advantages thereof, will be more fully understood hereinafter as a result of a detailed description of a preferred embodiment when taken in conjunction with the following drawings in which.

DETAILED DESCRIPTION OF A PREFERRED EMBODIMENT

Figure 1:
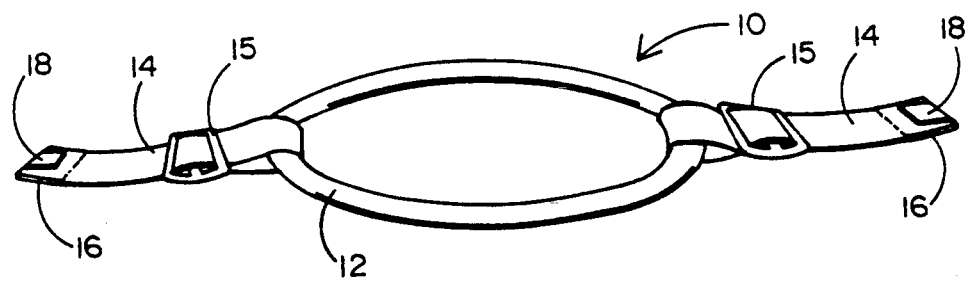
FIG. 1 provides an isometric view of the crown ring, adjustable straps and first Velcro pads of the invention.
Figure 2:
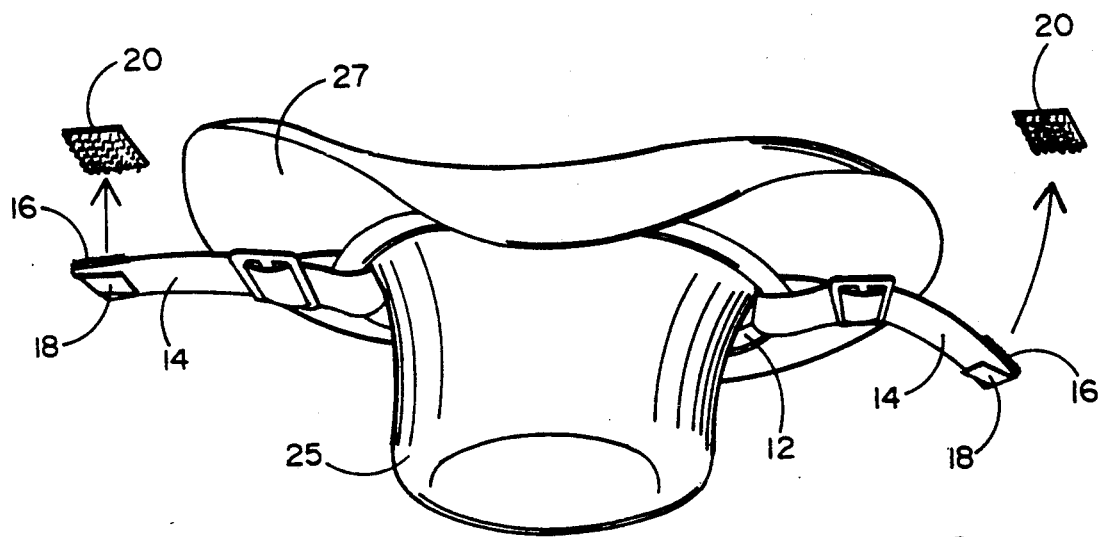
FIG. 2 is an isometric view of the invention shown supporting a typical hat and in position for attachment to a pair of second Velcro pads.
Figure 3:
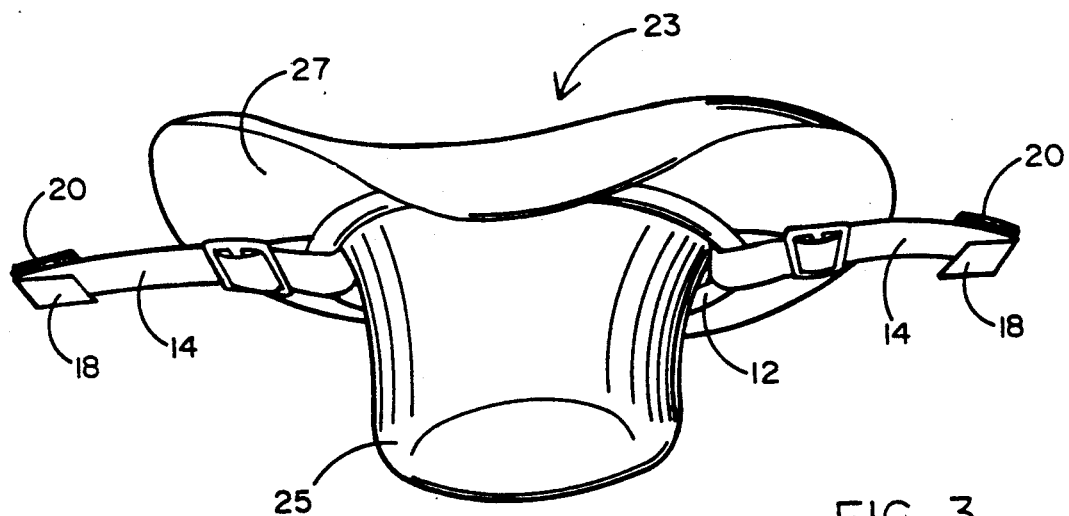
FIG. 3 is an isometric view of the invention similar to that of FIG. 2, but showing the hat holder in its fully installed, hat supporting configuration.

Referring now to FIGS. 1, 2 and 3, it will be seen that hat holder 10 of the present invention comprises a crown ring 12 attached to which there are a plurality of adjustable straps 14, the adjustability of which may be implemented by altering the position of a buckle 15 in a conventional manner. Each such adjustable strap 14 terminates at the end thereof opposite crown ring 12 in an interface to a first Velcro pad 16. An optional pull tab 18 may be provided on each peripheral or outer end of the first Velcro pads 16 to facilitate separation of the first Velcro pad 16 from the corresponding second Velcro pad 20. Each such second Velcro pad 20 is provided with a tacky adhesive on the surface thereof opposite the surface which adheres to the corresponding first Velcro pad 16. This tacky adhesive is designed to permit non-invasive affixation of the second Velcro pads 20 to an underlying surface such as the interior roof of a vehicle. The relationship between the first Velcro pads 16 and the second Velcro pads 20 is best illustrated in FIGS. 2 and 3 wherein FIG. 2 shows the respective pads separated in a relative spread position which would allow easy removal of the hat holder 10 from a hat 23, while FIG. 3 illustrates the two sets of Velcro pads in there interconnected positions wherein hat holder 10 secures hat 23 in its stored position.

Figure 4:
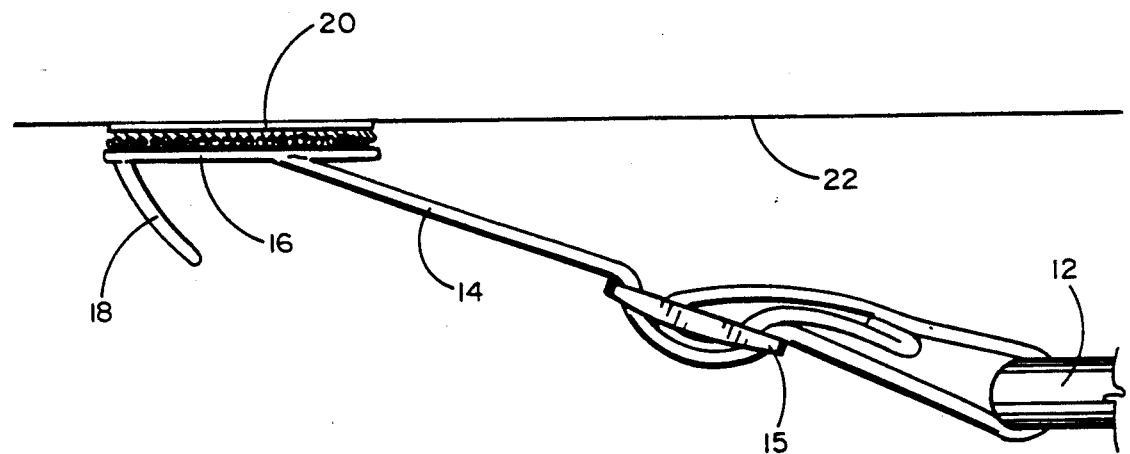
FIG. 4 is an enlarged detailed view of the interface between the adjustable strap and first Velcro pad of the present invention.

One of the significant novel features of the present invention is its adjustability. This adjustability is provided by a combination of the adjustable straps 14 and the adjustability or relative selectability of the placement of second Velcro pads 20 on an underlying surface 22 as seen in FIG. 4. More specifically, by adjusting the length of each of adjustable straps 14 and by selecting the separation between the second Velcro pads 20, it is possible to position the crown ring 12 over a relatively broad range of distances from the surface 22 thereby accommodating both different shapes and sizes of hats 23 and different contours of hat brims 27 and crowns 25. In addition, the present invention makes it possible to apply little or no pressure of any portion of the hat structure against the surface 22, but instead forms a receptacle in the form of crown ring 12, the position of which permits a hat 23 to rest with its crown 25 extending through the ring 12.

An additional significant feature of the present invention is illustrated in FIG. 4. More specifically, as seen in FIG. 4, the interconnection between the end of adjustable strap 14 and the first Velcro pad 16 is at a position which is closer to the ring side or inner edge of Velcro pad 16 than it is to the peripheral or outer edge of the Velcro pad. In fact, it has been found that the optimum position for this interface occurs at a location less than 50% of the width of the Velcro pad 16 and more than 25% of the width of the pad. In a preferred embodiment of the invention shown in FIG. 4, the location of this interface is about $33\frac{1}{3}\%$ or $\frac{1}{3}$ the width of Velcro pad 16 By way of further explanation, it will be seen in FIG. 4 that the interface between the end of adjustable strap 14 and the surface of first Velcro pad 16 occurs along the line which is about $\frac{1}{3}$ the width of the Velcro pad from the inner edge of the pad and $\frac{2}{3}$ of the width of the Velcro pad from the outer edge of the pad. In this manner, the lines of tensile force along the adjustable straps 14 intersect the Velcro interface between first Velcro pad 16 and second Velcro pad 20 at about the center thereof, thereby optimizing the resisting force between the pads 16 and 20 and minimizing the risk of an inadvertent separation between the two pads due to the weight of the hat 23.

Figure 5:
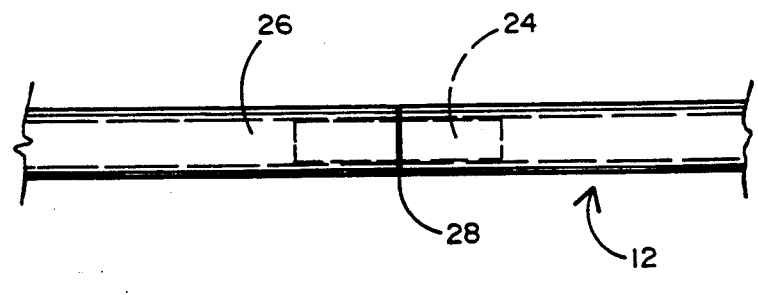
FIG. 5 is an enlarged detailed view of the crown ring of the present invention and specifically the manner for connecting a plastic hollow tube in a ring configuration.

Still another significant feature of the present invention is illustrated in FIG. 5. As shown in FIG. 5, the crown ring 12 is of a hollow, tubular configuration having a junction 28 formed bend-to-end butting relationship of the ends of the tube 26. It will also be seen in FIG. 5 that at the junction 28 there is provided an inner tubular member 24 which may, for example, be made of the same plastic material as tube 26, but which may be provided in only a short stub configuration. The outer surface of member 24 which is in intimate contact and contiguous engagement with the inner surface of tube 26. In a preferred embodiment of the invention herein, it has been found advantageous to provide a glue or adhesive to reliably and securely affix the ends of tubes 26 at the junction 28 to the member 24.

It will now be understood that what has been disclosed herein comprises an improved hat, holder having a crown ring and at least two adjustable straps for receiving a hat of the type having a crown and a brim for securing the hat to a surface, the straps being connected to the surface by means of a first pair of Velcro pads connected to the ends of the straps and a second pair of Velcro pads adhesively connected to the surface whereby the hat may be conveniently placed or removed from the holder by simply separating one or both such straps at the Velcro pads from the surface. The invention provides various significant and novel features pertaining to ease of securing the holder to the surface without invading or corrupting the surface by means of holes or tears. Other novel features include a unique plastic tube crown ring which will not stain or indent the hat fabric; adjustable straps which allow adjustment for different brim shapes and thicknesses as well as unusual contours in the brim or crown of the hat; and a unique interface between the adjustable straps and the Velcro pads which prevents inadvertent release of the hat from the holder.

Those having skill in the art to which the present invention pertains will now, as a result of the applicant's teaching herein, perceive various modifications and additions which may be made to the invention. By way of example, the specific shape, dimensions and configuration of the crown ring, adjustable straps and Velcro pads shown herein may be readily modified to accommodate substantially different shapes and dimensions of hats. Furthermore, the number of straps shown herein may be reduced to one for vertical wall installations or increased so as to provide additional hat supporting structure. Furthermore, while the present invention has been shown attached to a planar horizontal surface, it will be understood that the invention may be utilized in conjunction with nonplanar surface as well as surfaces that are more vertical than horizontal such as a vertical wall. Accordingly, it will be understood that all such modifications and additions are deemed to be within the scope of the invention which is to be limited only by the claims appended hereto.

I claim:

1. An apparatus for holding a hat against a surface, the hat of the type having a non-planar contoured brim and a crown; the apparatus comprising:
   a crown ring for encircling the hat crown for nesting engagement with the hat brim;
   at least one strap, each said strap adjustable in length and affixed at one end to said crown ring at spaced intervals along said ring and having a second end extending therefrom, said second end of said strap being coupled to a hook and loop attachment pad, said attachment pad being defined by a pair of opposing edges disposed transverse to said extension of said strap wherein one of said edges is adjacent said crown ring, said second end of said strap being coupled to said attachment pad intermediate said opposing edges of said attachment pad and substantially closer to said edge adjacent said crown ring; and
   at least one mating hook and loop pad, one said mating pad being associated with each of said attachment pads, said mating Velcro pads being affixed to said surface for releasably securing said straps thereto, whereby resistance to inadvertent separation of said releasable securement is substantially maximized by said intermediate coupling of said second end of said strap to said attachment pad;
   said crown ring comprising a flexible circular tube devoid of sharp edges and made of a material which will readily deform in response to the weight of said hat.

2. An apparatus for holding a hat against a surface, the hat of the type having a non-planar contoured brim and a crown; the apparatus comprising:
   a crown ring for encircling the hat crown for nesting engagement with the hat brim;
   at least one strap, each said strip affixed at one end to said crown ring at spaced intervals along said ring and having a second end extending therefrom, said second end of said strap being coupled to a hook and loop attachment pad, said attachment pad being defined by a pair of opposing edges disposed transverse to said extension of said strap wherein one of said edges is adjacent said crown ring, said second end of said strap being coupled to said attachment pad intermediate said opposing edges of said attachment pad and substantially closer to said edge adjacent said crown ring; and
   at least one mating Velcro pad, one such mating pad being associated with each of said attachment pads, said mating Velcro pads being affixed to said surface for releasably securing said straps thereto, whereby resistance to inadvertent separation of said releasable securement is substantially maximized by said intermediate coupling of said second end of said strap to said attachment pad;
   said crown ring comprising a flexible circular tube devoid of sharp edges and made of a material which will readily deform in response to the weight of said hat; and
   a common inner tubular member positioned coaxially within said flexible tube, said flexible tube being secured in a circular configuration by frictional engagement at the abutting ends of said tube with said common inner tubular member.

3. An apparatus for holding a hat against a surface, the hat of the type having a non-planar contoured brim and a crown; the apparatus comprising:
   a crown ring for encircling the hat crown for nesting engagement with the hat brim;
   at least one strap, each said strip affixed at one end to said crown ring at spaced intervals along said ring and having a second end extending therefrom, said second end of said strap being coupled to a hook and loop attachment pad, said attachment pad being comprised of a pull tab and being defined by a pair of opposing edges disposed transverse to said extension of said strap wherein one of said edges is adjacent said crown ring, said second end of said strap being coupled to said attachment pad intermediate said opposing edges of said attachment pad and substantially closer to said edge adjacent said crown ring; and
   at least one mating hook and loop pad, one said mating pad being associated with each of said attachment pads, said mating Velcro pads being affixed to said surface for releasably securing said straps thereto, whereby resistance to inadvertent separation of said releasable securement is substantially maximized by said intermediate coupling of said second end of said strap to said attachment pad;

said crown ring comprising a flexible circular tube devoid of sharp edges and made of a material which will readily deform in response to the weight of said hat.

4. An apparatus for holding a hat against a surface, the hat of the type having a brim with non-planar contoured portions and a crown; the apparatus comprising:

a crown ring for encircling the hat crown for nesting engagement with the hat brim;

a singular opposing pair of length-adjustable straps, each said strap affixed at a first end to said crown ring and extending radially outward from opposing sides of said crown ring for supporting said hat without substantially contacting said non-planar contoured portions of said brim; and means for releasably securing a second end of said straps to said surface for selectively installing and removing said hat;

said crown ring comprising a flexible circular tube devoid of sharp edges and made of a material which will readily deform in response to the weight of said hat; and a common inner tubular member positioned coaxially within said flexible tube, said flexible tube being secured in a circuit configuration by frictional engagement at this abutting ends of said tube with said common inner tubular member.

5. An apparatus for holding a hat against a surface, the hat of the type having a brim with non-planar contoured portions and a crown; the apparatus comprising:

a crown ring for encircling the hat crown for nesting engagement with the hat brim;

a singular opposing pair of length-adjustable straps, each said strap affixed at a first end to said crown ring and extending radially outward from opposing sides of said crown ring for supporting said hat without substantially contacting said non-planar contoured portions of said brim; and means for releasably securing a second end of said straps to said surface for selectively installing and removing said hat, said securing means comprising a pair of mating hook and loop pads associated with each said strap, said pair of pads comprising a first pad attached to said second end of said strap and a second pad affixed to said surface;

said crown ring comprising a flexible circular tube devoid of sharp edges and made of a material which will readily deform in response to the weight of said hat.

* * * * *